United States Patent
Miller et al.

[11] Patent Number: 5,895,431
[45] Date of Patent: *Apr. 20, 1999

[54] COMMUNICATION SYSTEM USED TO ASSIST DELIVERIES OF GOODS OR SERVICES

[75] Inventors: Phillip Miller; Steven E. Koenck; Jerry L. Walter, all of Cedar Rapids, Iowa; Joseph J. Kubler, Nederland, Colo.; Keith K. Cargin, Jr., Cedar Rapids, Iowa; George E. Hanson, Cedar Rapids, Iowa; Patrick H. Davis, Cedar Rapids, Iowa; Steven R. Kunert, Cedar Rapids, Iowa; Darald R. Schultz, Cedar Rapids, Iowa

[73] Assignee: Norand Corporation, Cedar Rapids, Iowa

[*] Notice: This patent is subject to a terminal disclaimer.

[21] Appl. No.: 08/984,337

[22] Filed: Dec. 2, 1997

Related U.S. Application Data

[63] Continuation of application No. 08/480,587, Jun. 7, 1995, Pat. No. 5,694,318, which is a continuation of application No. 07/947,820, Sep. 18, 1992, Pat. No. 5,457,629, which is a continuation-in-part of application No. 07/305,302, Jan. 31, 1989, abandoned, and application No. 07/347,602, May 3, 1989, abandoned.

[51] Int. Cl.⁶ ........................................ G06F 13/00
[52] U.S. Cl. ..................................... 701/1; 455/575
[58] Field of Search .............. 701/1, 36; 340/825.52, 340/825.03–825.08; 705/26, 28, 29; 455/575; 707/10

[56] References Cited

U.S. PATENT DOCUMENTS

| | | | |
|---|---|---|---|
| 4,345,147 | 8/1982 | Aaron et al. | 235/385 |
| 4,739,183 | 4/1988 | Tokura et al. | 307/9 |
| 4,773,032 | 9/1988 | Uehara et al. | 364/709.04 |
| 4,801,786 | 1/1989 | Stobbe | 235/377 |
| 4,857,716 | 8/1989 | Gombrich et al. | 235/462 |
| 5,029,183 | 7/1991 | Tymes | 375/1 |

*Primary Examiner*—Michael Zanelli
*Attorney, Agent, or Firm*—Akin, Gump, Strauss, Hauer & Feld, L.L.P.

[57] ABSTRACT

A vehicle for transport, fork lift or delivery route operations, for example, includes on-board peripherals which are coupled through a Local Area Network (LAN) into a data system. A LAN data bus provides selective access to the peripherals or data devices such as, for example, a large area display, a keyboard, a printer and a data terminal. The data system controls or provides data on tasks executed by or in connection with the operation of the vehicle. To increase the versatility of the vehicle, the data terminal, multiple data terminals, or any of the other data devices may be removably coupled to the LAN to be operable externally of the vehicle. A mobile mount adapter provides a secure electrical connection of a respective data terminal to the LAN to removably incorporate the data terminal into the data system, and provide a common supply of both data and power to the data device.

17 Claims, 11 Drawing Sheets

COMMUNICATION SYSTEM USED TO ASSIST DELIVERIES OF GOODS OR SERVICES

CROSS REFERENCE TO RELATED APPLICATIONS

The present application is a continuation of U.S. Ser. No. 08/480,587, filed Jun. 7, 1995, now U.S. Pat. No. 5,694,318, which is a continuation of U.S. Ser. No. 07/947,820, filed Sep. 18, 1992, now U.S. Pat. No. 5,457,629, which is a continuation-in-part of the following abandoned applications:

| U.S. SER. NO. | FILING DATE | NAMED INVENTORS |
|---|---|---|
| 07/305,302 | 01-31-89 | Phillip Miller |
| | | Steven E. Koenck |
| | | Joseph J. Kubler |
| | | Keith K. Cargin, Jr. |
| | | George E. Hanson |
| | | Patrick H. Davis |
| 07/347,602 | 05-03-89 | Phillip Miller |
| | | Steven E. Koenck |
| | | Jerry L. Walter |
| | | Joseph J. Kubler |
| | | Keith K. Cargin, Jr. |
| | | George E. Hanson |
| | | Patrick H. Davis |
| | | Steven R. Kunert |
| | | Darald R. Schultz |

The foregoing co-pending applications refer to the following earlier applications pursuant to 35 U.S.C. 120, and reference is hereby made to these earlier applications herein in accordance with the provisions of 35 U.S.C. 120:

| U.S. SERIAL NO. | FILING DATE | NAMED INVENTORS |
|---|---|---|
| 06/915,023 (Abandoned) | 10-03-86 | Keith K. Cargin, Jr. |
| | | George E. Hanson |
| | | Phillip Miller |
| 06/928,916 (Abandoned - parent of 07/212,435) | 11-07-86 | Keith K. Cargin, Jr. |
| | | George E. Hanson |
| 07/212,435 (U.S. 5,023,823) | 06-28-88 | Keith K. Cargin, Jr. |
| | | George E. Hanson |
| 07/136,097 (Abandoned) | 12-21-87 | Phillip Miller |
| | | Jerry L. Walter |
| | | Darrell L. Boatwright |
| 07/327,660 (Abandoned - parent of 07/551,663, now U.S. 5,052,943) | 03-23-89 | Patrick H. Davis |
| 07/339,330 (Abandoned) | 04-14-89 | Keith K. Cargin, Jr. |
| | | Stephen J. Kelly |
| | | Kevin Lewis Fischer |
| | | William T. Gibbs |
| | | Darrell L. Boatwright |
| | | Dennis Alan Durbin |
| 07/345,200 (Abandoned) | 04-28-89 | George E. Hanson |
| 07/346,771 (Abandoned) | 05-02-89 | Phillip Miller |
| | | Steven E. Koenck |
| | | Jerry L. Walter |
| | | Joseph J. Kubler |
| | | Keith K. Cargin, Jr. |
| | | George E. Hanson |
| | | Patrick H. Davis |
| | | Steven R. Kunert |
| | | Darald R. Schultz |
| 07/347,298 | 05-02-89 | Phillip Miller |
| (Abandoned) | | Robert J. Traeger |
| | | Joseph J. Kubler |
| | | Keith K. Cargin, Jr. |
| | | George E. Hanson |
| | | Patrick H. Davis |
| | | Darald R. Schultz |
| 07/266, 537 (Abandoned - a continuation-in-part of 07/168,352 (U.S. 4,885,523) | 11-02-88 | Steven E. Koenck |
| 07/168,352 | 03-15-88 | |
| 07/104,653 (Abandoned - parent of 07/406,822, now U.S. 4,953,113) | 10-02-87 | George E. Chadima, Jr. |
| | | Darald R. Schultz |
| 07/227,195 (Abandoned) | 08-02-88 | George E. Chadima, Jr. |
| | | Darald R. Schultz |

Each of the above identified co-pending and earlier applications, and the entire disclosure of each application, including the drawings and appendices, is incorporated herein by reference.

AUTHORIZATION PURSUANT TO 37 CFR 1.71 (d) and (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to a vehicle data system wherein a multiplicity of devices, such as two-way radio data transceivers, bar code scanners, RF tag readers, large format keyboards and displays, printers, electronic scales and other types of measuring devices, may be associated on board an individual delivery route vehicle, material handling vehicle, or the like.

Factory and warehouse material handling can take many forms. The simplest operations may involve individuals manually carrying goods from one point to another. As materials get larger and more material is moved, carts or lift trucks are typically used. Highly automated operations may use computer controlled storage and retrieval systems with complex systems of conveyors, elevators and handling equipment. Whether the system is automated or not, most material handling operations utilize human operated lift trucks of some type. The non-automated operations generally require the lift truck operator to get written instructions from a foreman or supervisor and then begin moving product per those instructions. More automated operations have often used two-way mobile radio communications to give instructions to operators in real time.

Shipping and distribution operations generally involve loading trucks with the correct materials or products, sending them to the correct destinations at the correct time, and unloading them in the correct order. Error or inefficiency in any of these operations may cause loss of time, revenue and ultimately profit. In recent years, the formerly manual methods of directing these processes have been replaced by computer supported techniques including computerized order entry and shipping instruction, route accounting on delivery vehicles, and direct store delivery of products. While most large operations utilize central computer systems to automate many of these processes, the use of computer data terminals on the vehicle is expanding to provide better operator productivity, information control and customer service.

In connection with the use of portable data systems on board such vehicles, it is conceived that it would be highly advantageous to be able to readily expand the number and types of on-board peripherals. The ability to easily add peripherals, such as bar code scanners, RF tag readers, large format displays and keyboards, printers, electronic scales and other types of measuring devices, offers further improvements in accuracy and efficiency. The ability to monitor critical vehicle performance parameters such as fuel economy, engine temperature and oil pressure, odometer and tachometer readings and the like offer the capability to manage and optimize the efficiency of a fleet of vehicles. The most effective application of these system components would result if all of the parts could be integrated into the system in an organized, logical fashion.

An important feature would be the ability to quickly and conveniently disconnect a selected portable device from any non-portable components and operate the same in a portable mode when needed. One exemplary application of radio data terminals involves reading bar coded labels on items or materials that are not accessible by a vehicle. Another situation where portability is advantageous is in reading labels on all four sides of a shipping pallet with individual packing containers placed such that the bar coded labels are arranged on the outside surface of the "stack". It would be much more convenient for an operator to read all the associated labels by walking around the stack than to maneuver the vehicle abound the pallet to read all the labels. Consequently, the radio terminal mounting system should ideally be configured so that the operator can easily remove the terminal from its mobile mount with its scanner attached, use the terminal portably, and return it to the mobile mount with minimal effort or care. Similarly, a route accounting terminal is removed from its vehicle mount regularly to be hand carried by the operator to the point where data is to be captured.

SUMMARY OF THE INVENTION

Accordingly, it is an important object of the present invention to provide a vehicle data system wherein components can be readily detached for portable operation and wherein various peripheral devices can be readily accommodated.

A further object resides in the provision of such a vehicle data system wherein multiple devices may be connected at different locations in different vehicles and integrated into a vehicle data communication system on a dynamic basis without interrupting system operation.

In a presently preferred configuration particularly suited for forklift truck applications and the like, a portable data terminal and a set of peripheral devices are connected via a vehicle local area network (LAN) having the following characteristics:

(1) The LAN is configured so that multiple devices may be connected simultaneously.

(2) The LAN provides reliable two-way data communication.

(3) The LAN may have a total length up to hundreds of feet for operation on virtually any vehicle.

(4) Any connected device may be inactive or off without having an effect on the other devices.

Power for operation of the portable data terminal is provided by the internal terminal batteries when used portably and by the vehicle when the terminal is placed in the vehicle mount. Further, the terminal batteries may receive charge while the terminal is operating from the vehicle power so that full battery capacity is available when portable operation is required.

In accordance with a further development of the invention, portable terminals, for example, may be quickly removed from the system, and may be placed in generally random physical network locations by the terminal users.

It is a feature of the invention to provide a network capable of assigning suitable identification to a newly added terminal or the like on a dynamic basis without requiring each device to have its own unique "hard" address, and without interruption of system operation.

A further feature of the invention provides a common supply of data and power to the vehicle devices.

Other objects, features and advantages will be apparent from the following detailed description, taken in connection with the accompanying drawings, and from the individual features and relationships of the appended claims.

DETAILED DESCRIPTION

Figure 1:
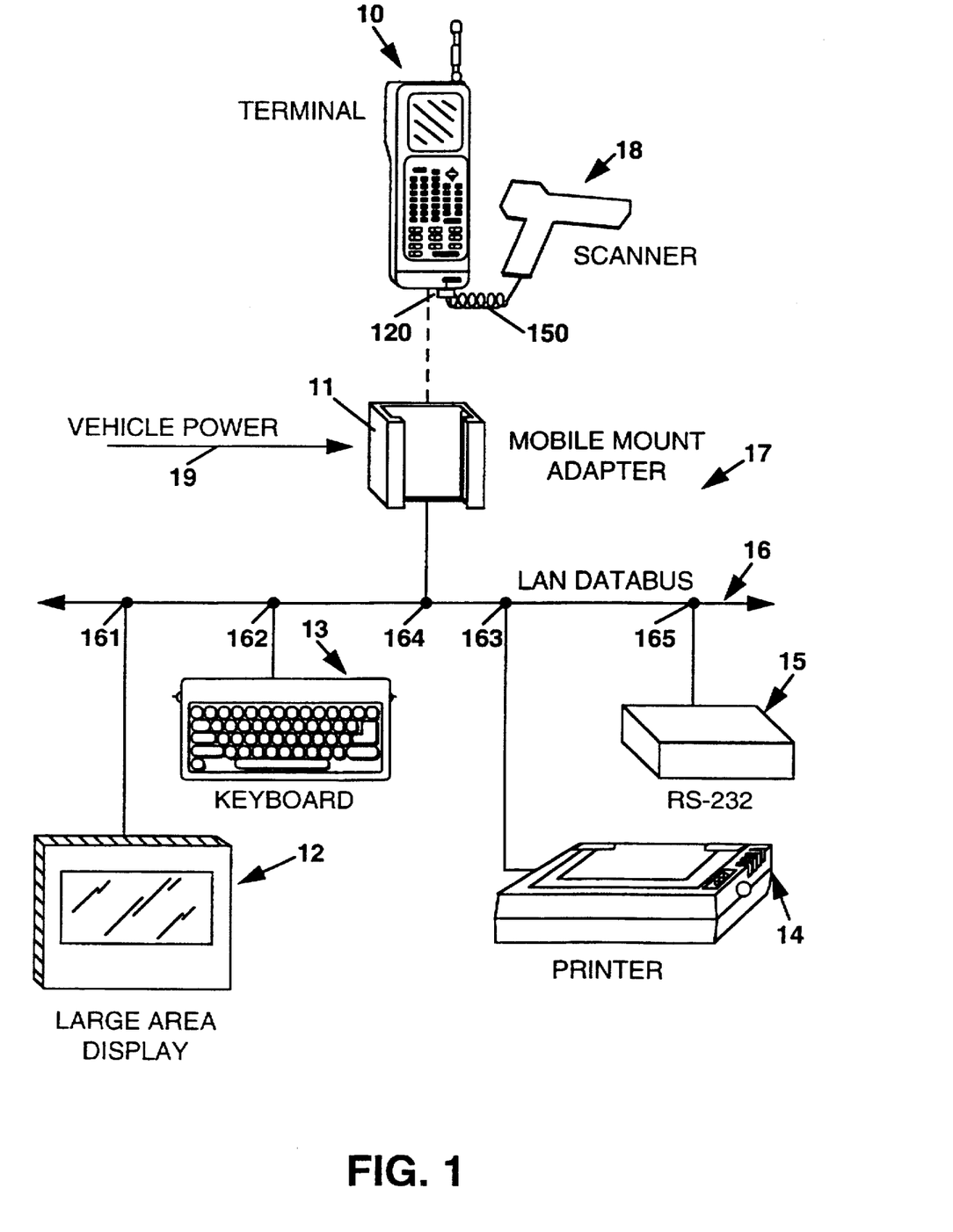
FIG. 1 is a diagrammatic illustration of a vehicle data system in accordance with the present invention, and which may represent a data system associated with a gasoline-powered or battery-powered material handling vehicle such as a forklift truck.

FIG. 1 shows a system comprised of a portable battery operated data terminal 10 which may be connected through an adapter 11, and a set of peripheral devices such is 12–15 (e.g. devices that might be particularly suited for forklift truck applications), the terminal and peripheral devices being coupled via a local area network data bus 16 of a self-propelled manually steered vehicle 17. For the case of a forklift truck 17, adapters such as 11 may releasably accommodate terminals such as terminal 10 which receive and store data obtained by means of an optical bar code or RF tag scanner 18. As indicated at 19, vehicle power is generally available from the electrical system of the vehicle. Certain electric vehicles such as lift trucks may operate from voltages as high as 72 volts, so higher voltage operation must be accommodated as well as the more typical value of twelve volts.

Figure 3:
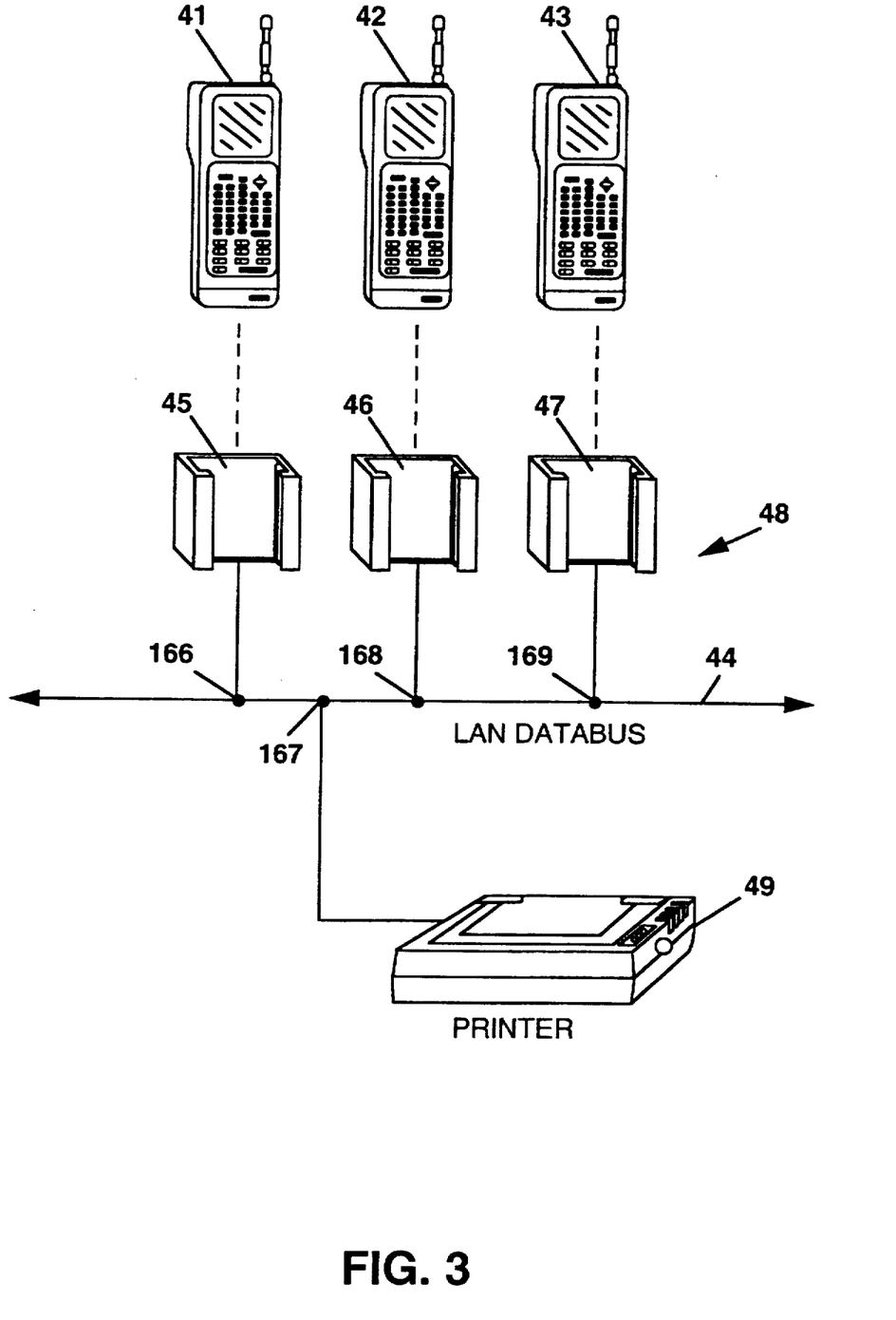
FIG. 3 shows a vehicle data system which may include the features and components of FIG. 1, and which further provides for plural terminals sharing a common peripheral device means such as a printer.
Figure 4:
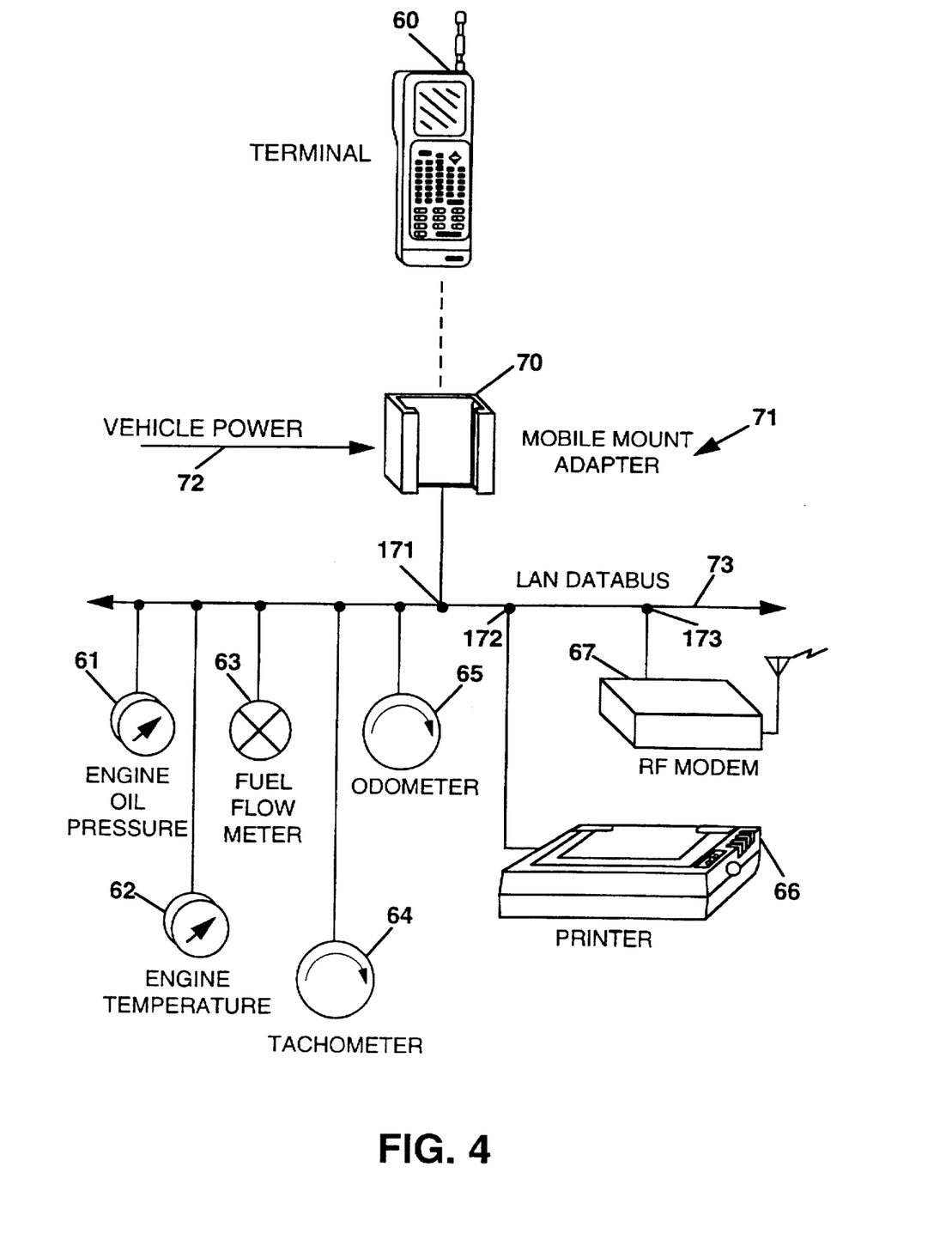
FIG. 4 shows a further vehicle data system in accordance with the present invention, which is particularly appropriate for product distribution applications and the like, features of FIG. 3 also being applicable to FIG. 4, and the RF link for example of FIG. 4 also being applicable to FIGS. 1–3.
Figure 5:
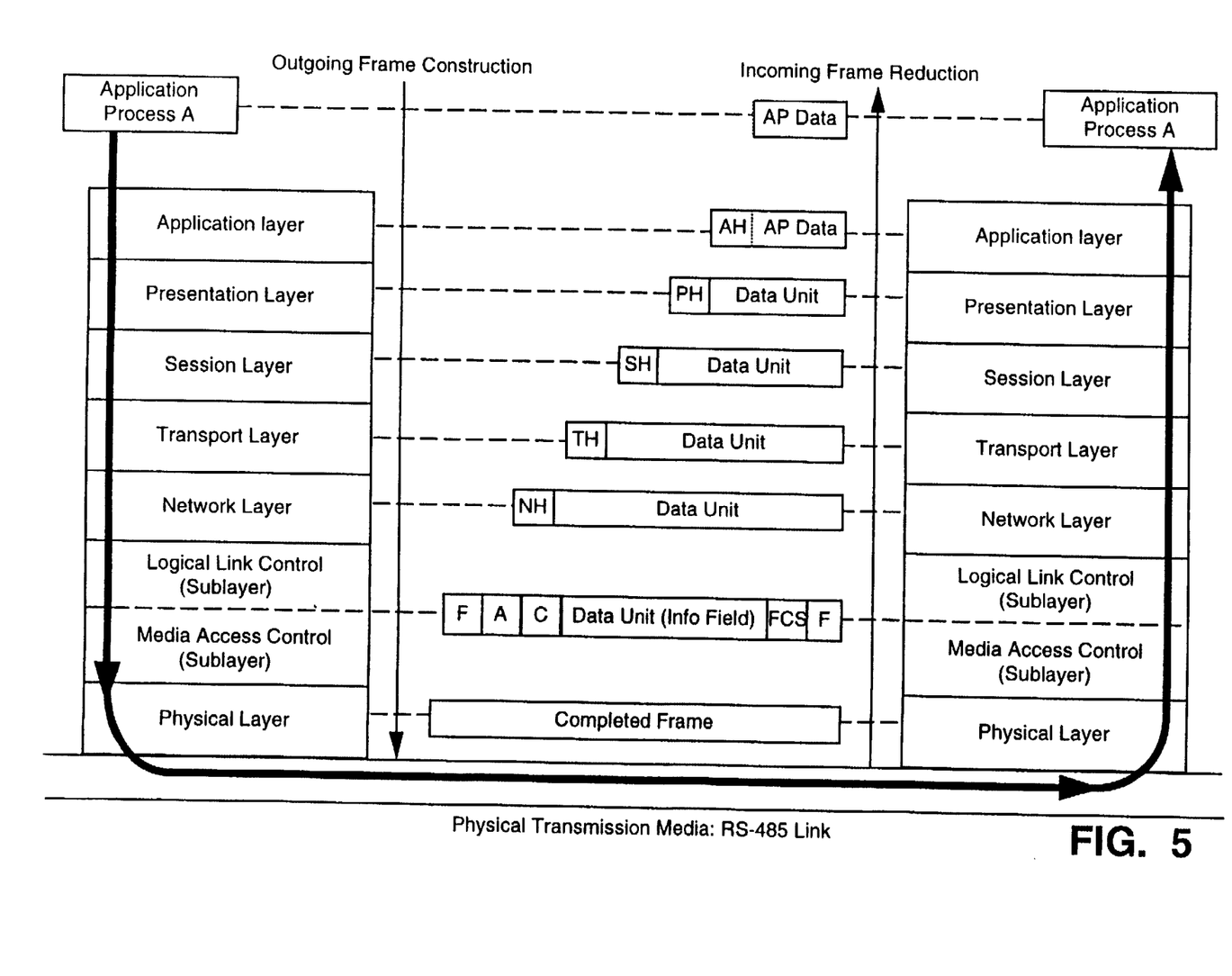
FIG. 5 is a diagram illustrating the various data processing layers of a preferred implementation of local area network and representing message frame construction for an outgoing transmission at the left and the inverse incoming frame reduction at the right, exemplary frame formats for the respective layers being represented centrally of the diagram, and an exemplary physical transmission link being indicated as a horizontal path at the bottom of the diagram (and corresponding to the LAN data bus transmission paths of FIGS. 1–4).

A preferred LAN configuration for the embodiments of FIGS. 1 through 6 may have the characteristics (1) through (4) described in the section headed SUMMARY OF THE INVENTION, and as further detailed hereafter in reference to FIG. 5.

A general characteristic of each LAN connected device in FIGS. 1 through 6 is that communication and control intelligence is required to receive and transmit information through the LAN. The terminal (e.g. terminal 10, FIG. 1) with its processor and memory system may serve as a communication controller or primary processor while each peripheral device (such as 12–15, FIG. 1) may comprise a secondary unit which typically contains a microcomputer to perform communication and control tasks. Certain applications may involve multiple terminals (such as 21–26, FIG. 2) connected to a single LAN data bus such as vehicle bus 16, FIG. 1, or such as LAN data bus 27 of fixed installation 28, FIG. 2. Multiple adapters such as 31–36 enable communication from terminal to terminal, and from any of multiple terminals to an RS-232 interface means such as 15, FIG. 1, or 37, FIG. 2. Such an interface may be used for data interchange with a host computer system overseeing a multiplicity of vehicles (such as 17, FIG. 1) or fixed installations (such as 28, FIG. 2), and may include the LAN controller (as indicated for interface means 37, FIG. 2).

Vehicle mounted terminals such as terminal 10, FIG. 1, may be removed from vehicle adapters such as 11 at the end of a working shift and physically inserted into one of the adapters 31–36 of a fixed installation 28 for transfer of accumulated data to a host computer. Components 15 and 37 may comprise LAN controller and protocol converters for adapting to an external RS-232 transmission system. Alternatively, a vehicle such as 17 could itself be coupled with a host computer via interface means 15, e.g. while for the case of an electrically driven vehicle, the vehicle batteries were being recharged. In each case, the batteries of terminals such as 21–26, FIG. 2, would be recharged e.g. from AC power as indicated at 38, FIG. 2. Where interface means 15, FIG. 1, does not include the LAN controller, terminals such as 10 may be automatically switched when in adapter 11 so as to activate primary LAN programming enabling the microcomputer of terminal 10 to act as the LAN controller when on board vehicle 17.

Figure 2:
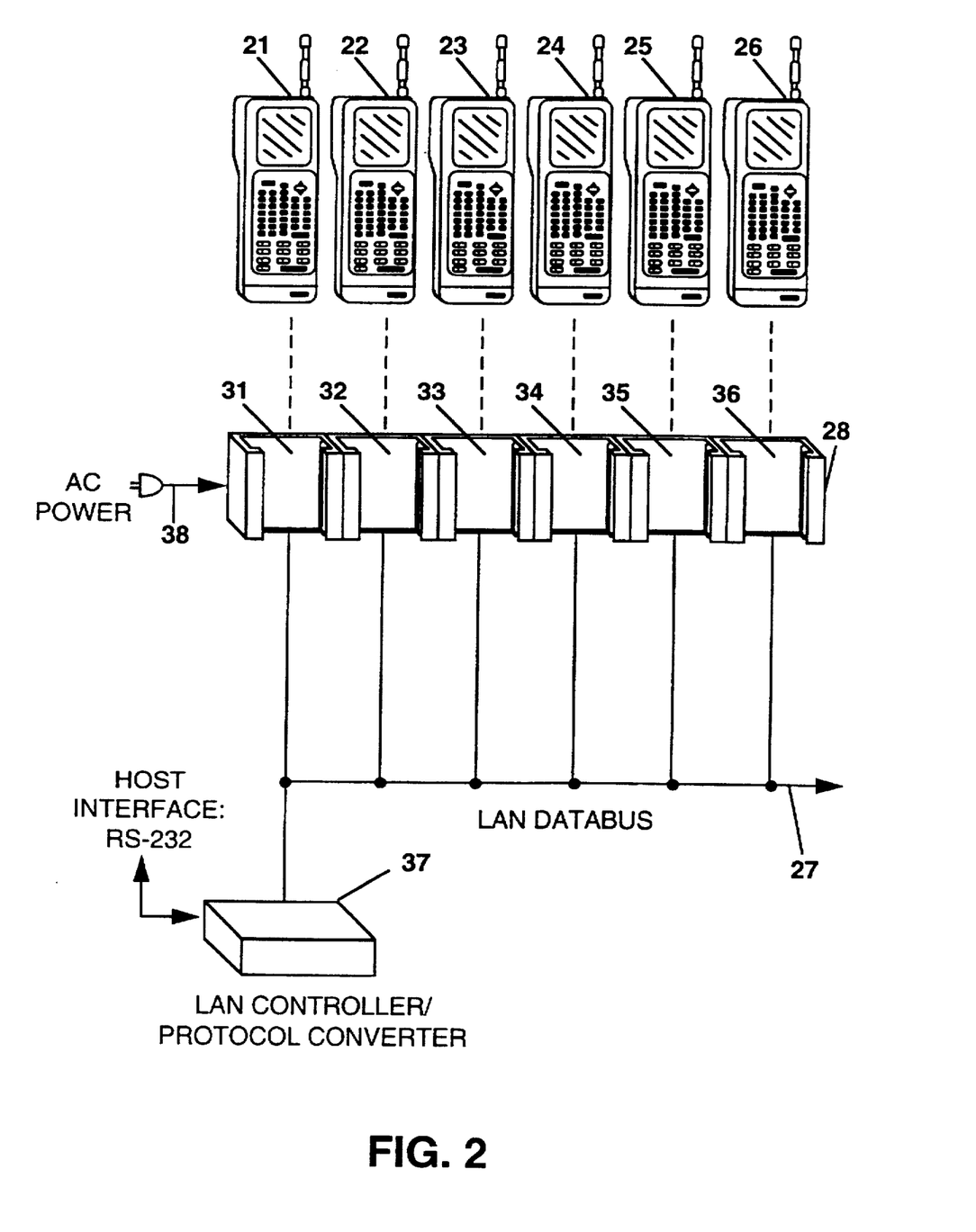
FIG. 2 shows by a similar diagrammatic illustration a fixed data system which may utilize adapters and a local area network corresponding to that of FIG. 1, and may receive terminals from vehicles such as that of FIG. 1, for purposes of interchange of data with a host computer, and for recharging of the terminal batteries.

When such a terminal 10 is inserted in one of adapters 31–36 on the other hand, the terminal would operate as a standard secondary unit, and be identified dynamically by means of the primary programming of the LAN controller of interface means 37.

As shown in FIG. 3, a series of terminals such as 41–43 may be coupled with a LAN data bus 44 via respective adapters such as 45–47 which may be part of self propelled manually steered vehicle 48. Such multiple terminals can thus share peripheral devices on board the vehicle such as printer 49. Again the LAN controller may be external to the terminals, e.g. associated with printer 49 or an interface means such as 15, FIG. 1, or 37, FIG. 2.

FIG. 4 shows a diagram of a data terminal 60 and peripherals 61–67 in an arrangement that might be particularly suited to a route or delivery truck application. The LAN communication protocol is preferably designed to coordinate and resolve all of the resultant communication requirements. As in FIG. 1, terminal 60 may contain programming to act as the LAN controller and may be removably received in a mobile mount adapter 70 of a vehicle 71 which supplies operating and recharging power to the terminal batteries as indicated at 72. RF coupling means 67 may alternatively contain the network controller and further may couple the LAN data bus 73 with a stationary host so that data from terminal 60 and from measurement means 61–65 may be supplied periodically to a host computer system, and data from the host may be supplied for example to printer 66 as needed. In FIG. 1, LAN data bus 16 may have an RF modem coupled therewith, and in each of FIGS. 1, 3 and 4, the terminals may receive scheduling information or the like whenever required during a working day, from a host computer system via an RF link, for example. Thus on-line communication with a host computer may be established at any time. The network controller when separate from the terminal may contain a special buffer memory for storing data for one or more terminals which may be temporarily disconnected from the network. Such network controller and buffer memory may be part of an RF unit having two-way on-line communication with a host computer, in any of the embodiments of FIGS. 1–4.

Description of FIG. 5

The application of a LAN communication structure for networking multiple portable terminals may present unique difficulties since the portable terminals may be removed from the system for various purposes such as those previously described herein. Further it is desirable to provide a system whereby the terminals may be placed in generally random physical network locations by the terminal users. Preferably the terminals may be identified on a dynamic basis as they are added to the local area network, without requiring a unique "hard" terminal address for each terminal which may be associated with the network.

A unique feature of the preferred LAN protocol of the present invention is in its structure for addressing that establishes "virtual" rather than permanent physical identification of the communicating devices. This is advantageous in that communication sessions may involve a set of physical devices and connections that are constantly being changed and rearranged (as is common with portable data terminals and their peripherals). The implementation of the LAN communication protocol preferably conforms to the International Standards Organization (ISO) reference model for Open System Interconnection with the functional operations broken into "layers" as diagrammed in FIG. 5. A detailed description of the LAN protocol is included in Appendix A of incorporated patent application Ser. No. 07/305,302.

Figure 6:
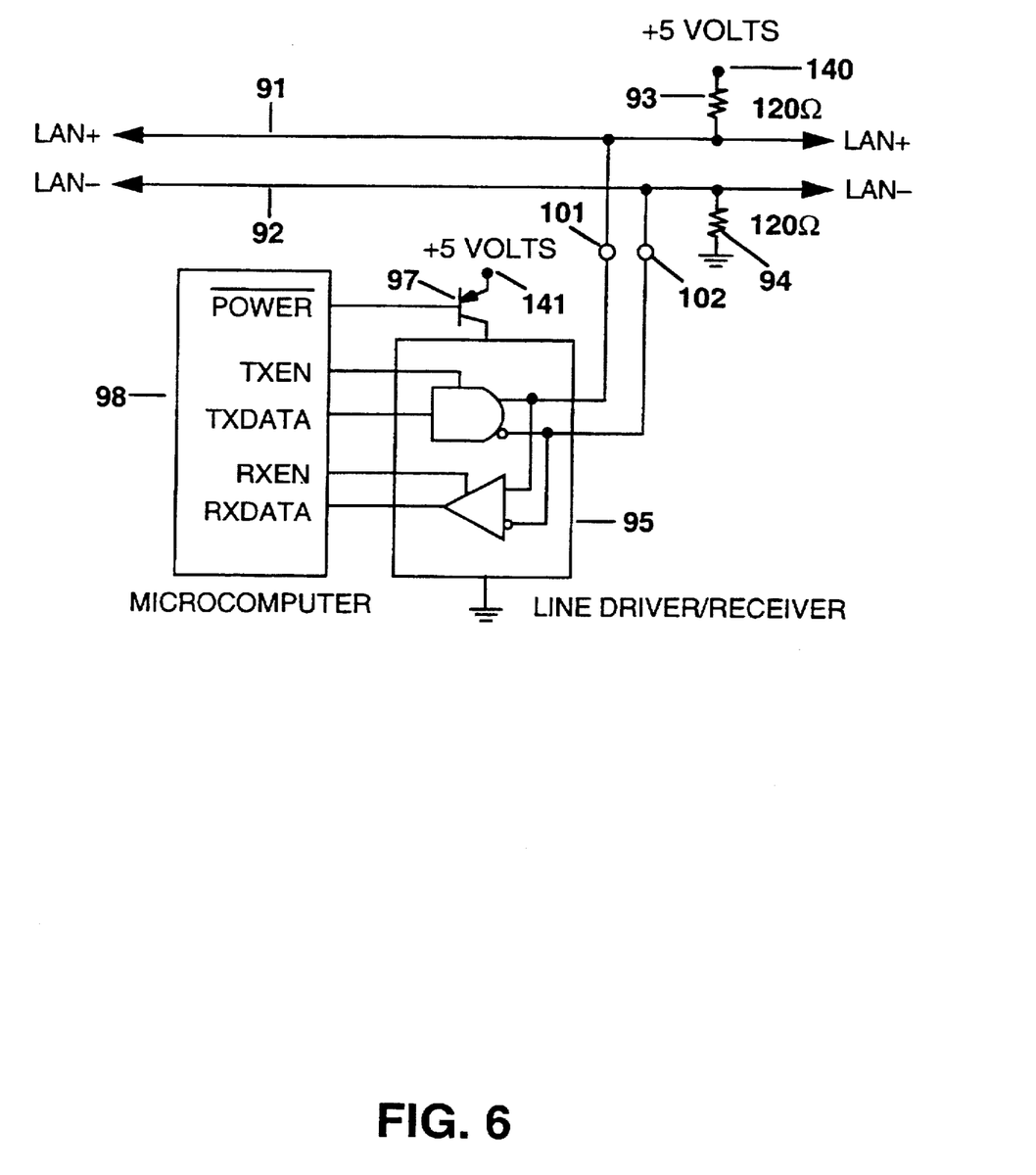
FIG. 6 shows a preferred electrical interface arrangement for coupling each of the terminals and peripheral devices of FIGS. 1–4 with the LAN transmission link of these Figures. The illustrated electrical interface of FIG. 6 is an example of a "physical layer" as diagrammed in FIG. 5.

Description of FIG. 6

The physical electrical interface to the LAN is preferably as diagrammed in FIG. 6. Here the LAN data bus consists of a balanced two-wire signal pair 91 and 92 conforming to the EIA RS 485 interface standard with tri-state wire-OR capability for the desired multi-drop characteristic. Because of the need for moderate line lengths (up to 100 feet), relatively fast signalling rates (up to 1 Mhz), and high immunity to electrical noise, the physical communication link must be treated as a transmission line with low characteristic impedance, typically 120 ohm. Line termination must be made through resistors such as 93 and 94 of a value equal to that characteristic impedance which results in a relatively high current required to drive a signal on the line. To achieve these characteristics, a line drive integrated circuit 95 is used that has sufficient output capability to provide the necessary output current. A typical device that has this capability is the Texas Instruments SN75176 type. In general, devices of this type are bipolar circuits that require significantly more operating current that is usually available in a portable product that is powered from batteries. To adapt the LAN data bus to the requirements of portable terminal devices such as shown in FIGS. 1-4, power to the line driver integrated circuit as indicated in FIG. 6 is switched e.g. by means of a power transistor 97 to minimize the battery current drain. Transistor 97 is shown as being controlled by a microcomputer 98 which may be part of the portable terminals of FIGS. 1-4. In general each peripheral in FIGS. 1-4 may also include a microcomputer for performing the functions of microcomputer 98.

It is useful to note that operation of the LAN is typically not needed when the terminal is being used in the portable mode, but is only required when the terminal is placed in a LAN interface adapter. In this mode, power for operation is provided externally from vehicle power rather than the terminal batteries. The quick removability of a terminal and scanner means from its mobile mount adapter means is symbolized by small circles 101 and 102 which in this case may represent the electrical connections formed between respective spring fingers 110, FIG. 7, of the mobile mount adapter means such as 11, and respective mating external contacts 111, FIGS. 7 and 9, of the terminal and scanner means.

With the driver/receiver and line termination arrangement as shown in FIG. 6, inactive or physically "not present" terminals represent virtually no loading or effect on the system. It is only when the terminal begins to transmit data that it is known to exist by the network. Consequently, no special switching or isolation is required to remove or replace a terminal from the system.

Figure 7:
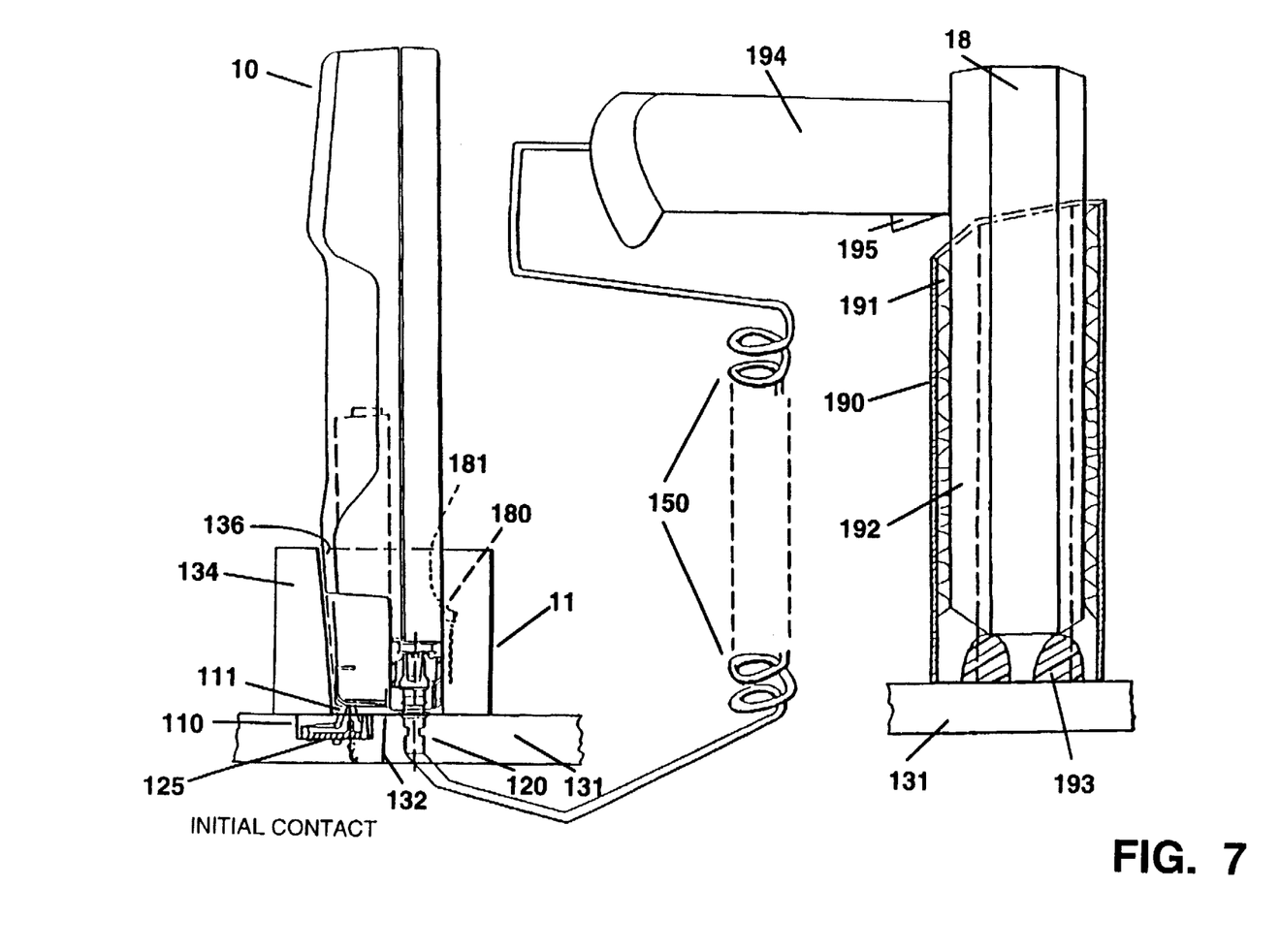
FIG. 7 is a somewhat diagrammatic partial vertical sectional view illustrating constructional details of a preferred adapter for the systems of FIGS. 1–4, a portable battery powered terminal corresponding to that of FIG. 1 being shown as being inserted part way into the adapter channel, to the point of initial electrical contact; and also indicating in diagrammatic fashion a laser bar code scanner device in a separate vehicle mounting or holster means and coupled with the terminal via an extendable coiled cable.
Figure 8:
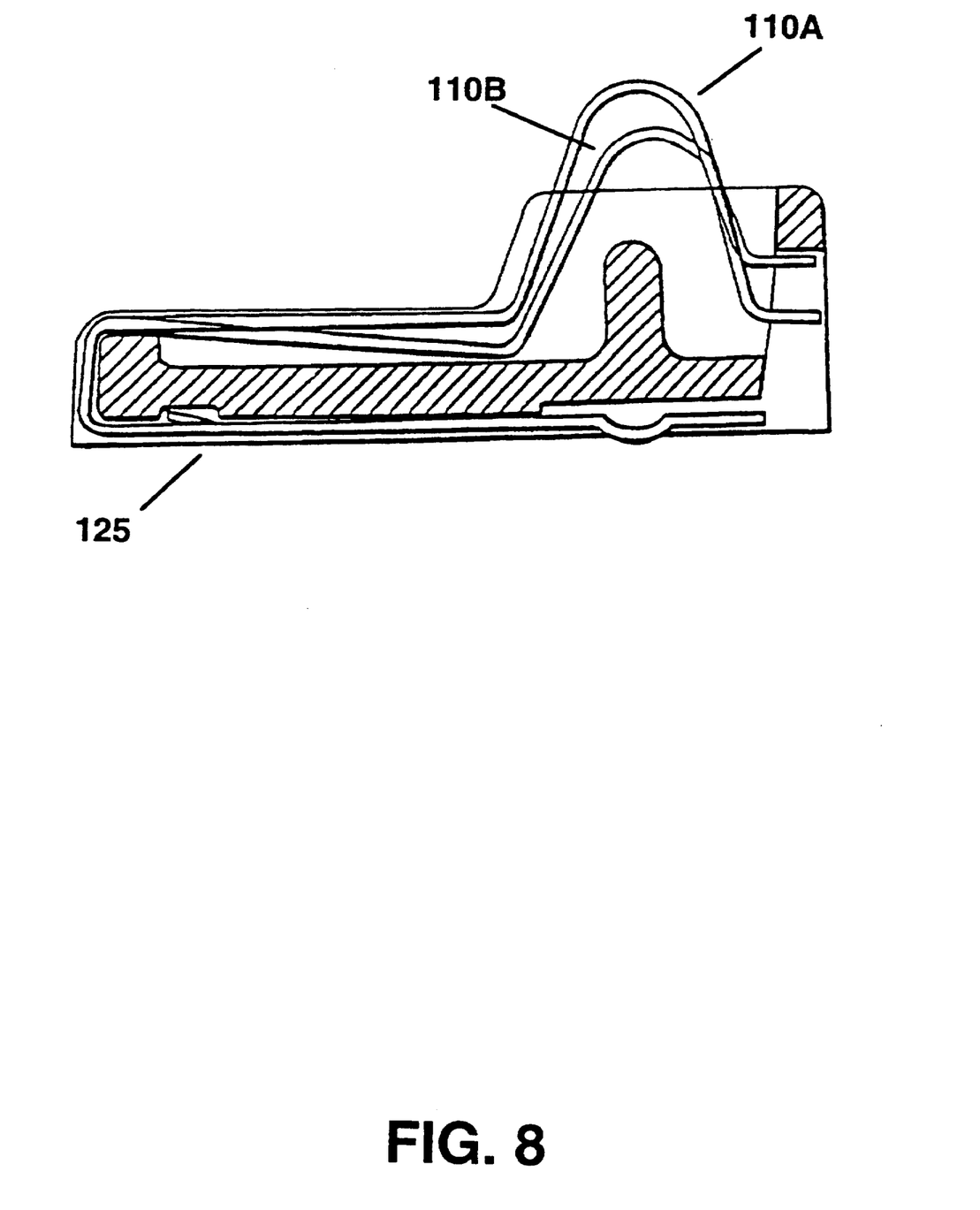
FIG. 8 is a somewhat diagrammatic longitudinal sectional view showing the adapter contact assembly of FIG. 7 on a greatly enlarged scale.
Figure 9:
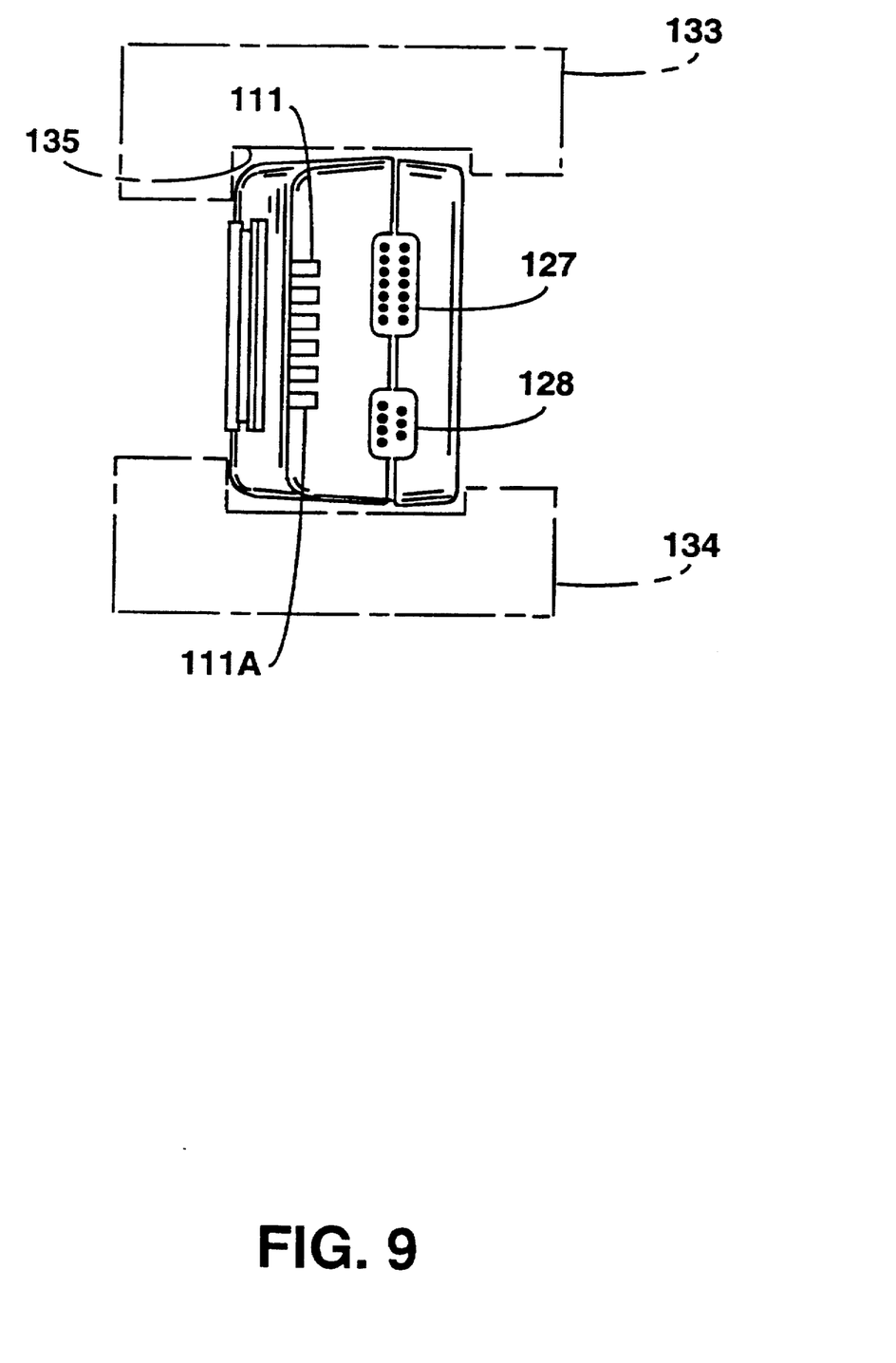
FIG. 9 is a diagrammatic bottom plan view of the terminal of FIGS. 1 and 7, illustrating the external contact area of the terminal and also the connector fittings for coupling the terminal with a scanner such as the hand-held laser bar code scanner which is diagrammatically indicated in FIGS. 1 and 7.

Description of FIGS. 7, 8 and 9

A significant difference between the LAN configurations typically used for personal computer networking and communications, and the configuration described here for use with portable data terminals has to do with the mechanical connector method employed for interface to the electrical network. Presently common commercially available LAN products may utilize coaxial cables and connectors, twisted pair conductors with some type of connector termination or in some cases, telephone wire with modular phone jacks. Each of these physical interface methods requires a "fastening" and "unfastening" operation when the attached device is connected and unconnected from the network. An important feature of the portable LAN described here is in its method of electrical connection between the LAN and the connected portable terminal which must be removed and replaced often during operation. To eliminate the need for fastening and unfastening of a connector, in a preferred embodiment conductive contacts 111 are exposed e.g. at an undersurface of each terminal such as terminal 10, FIG. 1, and each adapter such as 11 is provided with spring loaded mating contacts 110. The interface adapter holds the terminal securely in place while aligning the external contacts 111 with the mating contacts fingers 110. An additional feature of the LAN interface adapter for mobile mounting applications is in its "open face" which allows connection to a scanner such as 18, FIGS. 1 and 7, without impeding the placement and removal of the terminal from the adapter. Thus referring to FIG. 7, terminal 10 is shown in initial contact with the adapter indicated at 11, with a connector 120 leading to scanner 18 located in the open area of the adapter. The adapter may have a contact assembly 125 including spring fingers 110 aligned with respective terminal contacts 111. FIG. 8 is an enlarged view of contact assembly 125 and shows the initial position of contact finger 110 at 110A, and shows a deflected position at 110B (the terminal being fully inserted into and frictionally held by the adapter to maintain the deflected condition 110B of the spring fingers).

FIG. 9 is a bottom plan view of the terminal 10, showing its set of contacts such as 111, and showing connector fittings at 127 and 128 which may receive the scanner connector 120, FIG. 7. In FIGS. 7 and 9, adapter 11 is shown as comprising a base part 131 which may be notched at 132 to accommodate scanner fitting 120, and a pair of upstanding generally C shaped parts 133 and 134 which define a channel 135 for receiving the terminal 10. The parts 133 and 134 may have sloping surfaces such as 136, FIG. 7, which limit the downward movement of a terminal into the receiving channel, and serve to frictionally retain the terminal with a suitable degree of pressure between contacts such as 111 and mating spring fingers such as 110.

Discussion of Earlier Mobile System Development

The present application is related to the following earlier patent application: Phillip Miller et al application "MOBILE RESTAURANT SYSTEM AND NETWORK CONTROLLER THEREFOR" U.S. Ser. No. 06/915,023 filed Oct. 3, 1986, and abandoned Jan. 22, 1988.

The Miller et al application Ser. No. 06/915,023, is incorporated by reference in pending application Ser. No. 07/212,435 filed Jun. 28, 1988, now U.S. Pat. No. 5,023,823, issued Jun. 11, 1991 and was also incorporated into a parent of application Ser. No. 07/212,435, namely U.S. Ser. No. 06/928,916 filed Nov. 7, 1986, now abandoned.

The application of Phillip Miller et al U.S. Ser. No. 06/915,023 is hereby incorporated herein by reference in its entirety.

The incorporated application U.S. Ser. No. 06/915,023 in a second figure thereof shows a system block diagram including a network controller (NC) with a "RS 485" communications port (91) connected with a "RS 485" multi-drop bus system (75). System power from a vehicle power system (30,31,40) is supplied via a power line (PWR) to a series of point of sale registers (14-1 through 17-1) which are coupled to the RS 485 multi-drop bus system (75). In a fourth figure, a physical layout of a vehicle is shown wherein a conduit (140-1) for power and data (PWR & DATA) contains both a multi-drop data bus and power lines. Junction boxes (41-1, 51-1, 52-1, 54-1 and 55-1) serve to couple the multi-drop data bus and power lines with the point of sale registers (14-1, 16-1, 17-1). An unused junction box is shown in the PWR & data line. The fifth figure of the incorporated application shows the distribution of power from a vehicle system power source (e.g. a data processing battery 40-1) to the network controller via a power function box (41-1) and a further junction box (51-1) at the network controller (NC). A sixth figure illustrates charging of the data processing battery (40-1) from an alternator via suitable battery isolator means (such as 31-1). The ninth figure indicates the segments of conduit (140-IA, 140-IB, 140-IC) between successive junction boxes (41-1, 51-1, 54-1, 55-1, 52-1). This same type of power and data conduit system may be utilized in the product distribution vehicles (such as forklift trucks and delivery vans) illustrated in FIGS. 1, 3 and 4 herein. Thus FIGS. 1, 3 and 4 may have devices 11 to 15, 45, 46, 47, 49, 61 to 67 and 70 receiving vehicle power in the same way as shown in the second and fourth figures of the incorporated application Ser. No. 06/915,023, for example, and FIGS. 1 to 4 may be provided with a network controller as shown in the twelfth figure through sixteenth figure (parts A through G) of the incorporated application.

Figure 10:
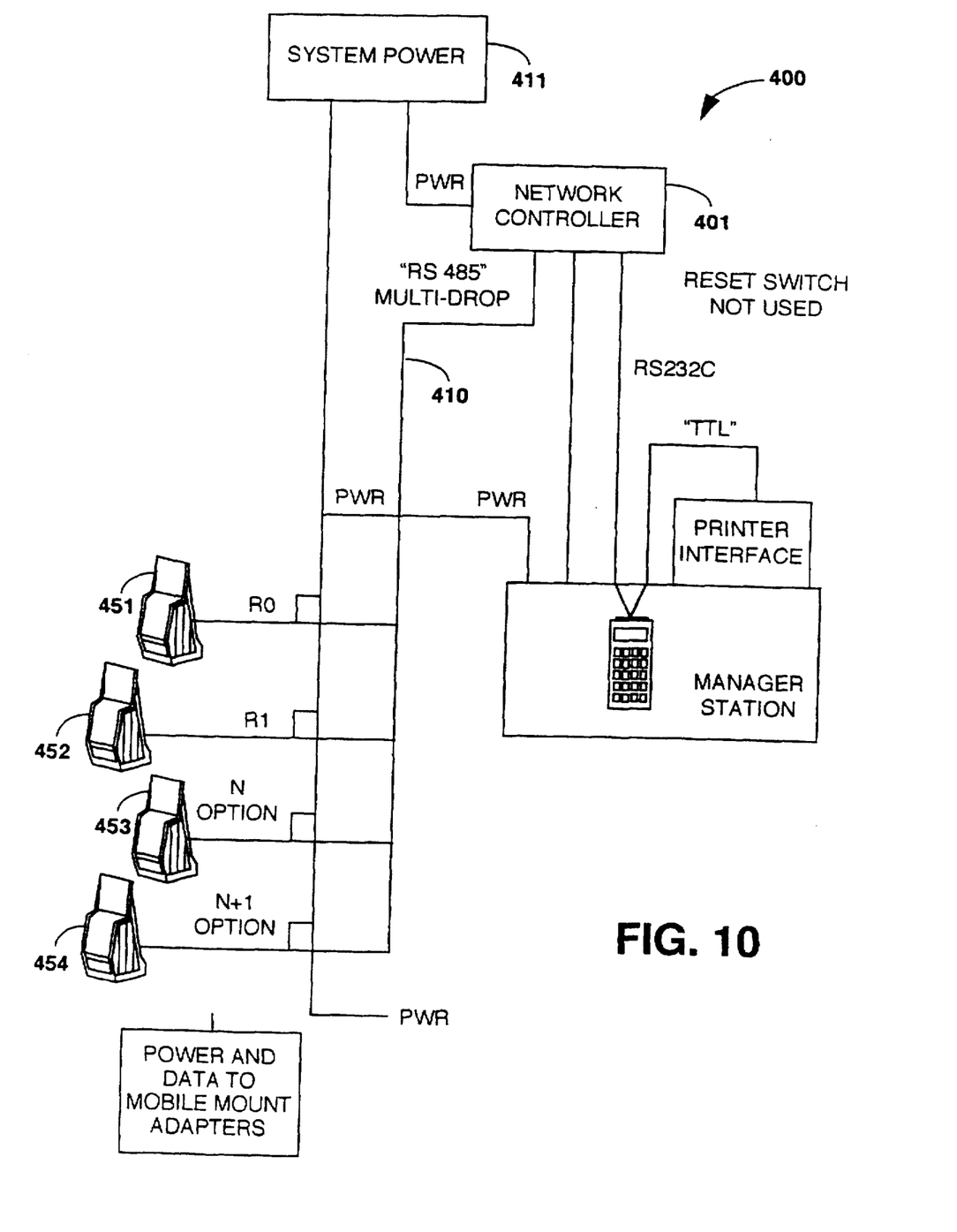
FIG. 10 is a diagrammatic illustration of a data collection system carried by a material transport vehicle.
Figure 11:
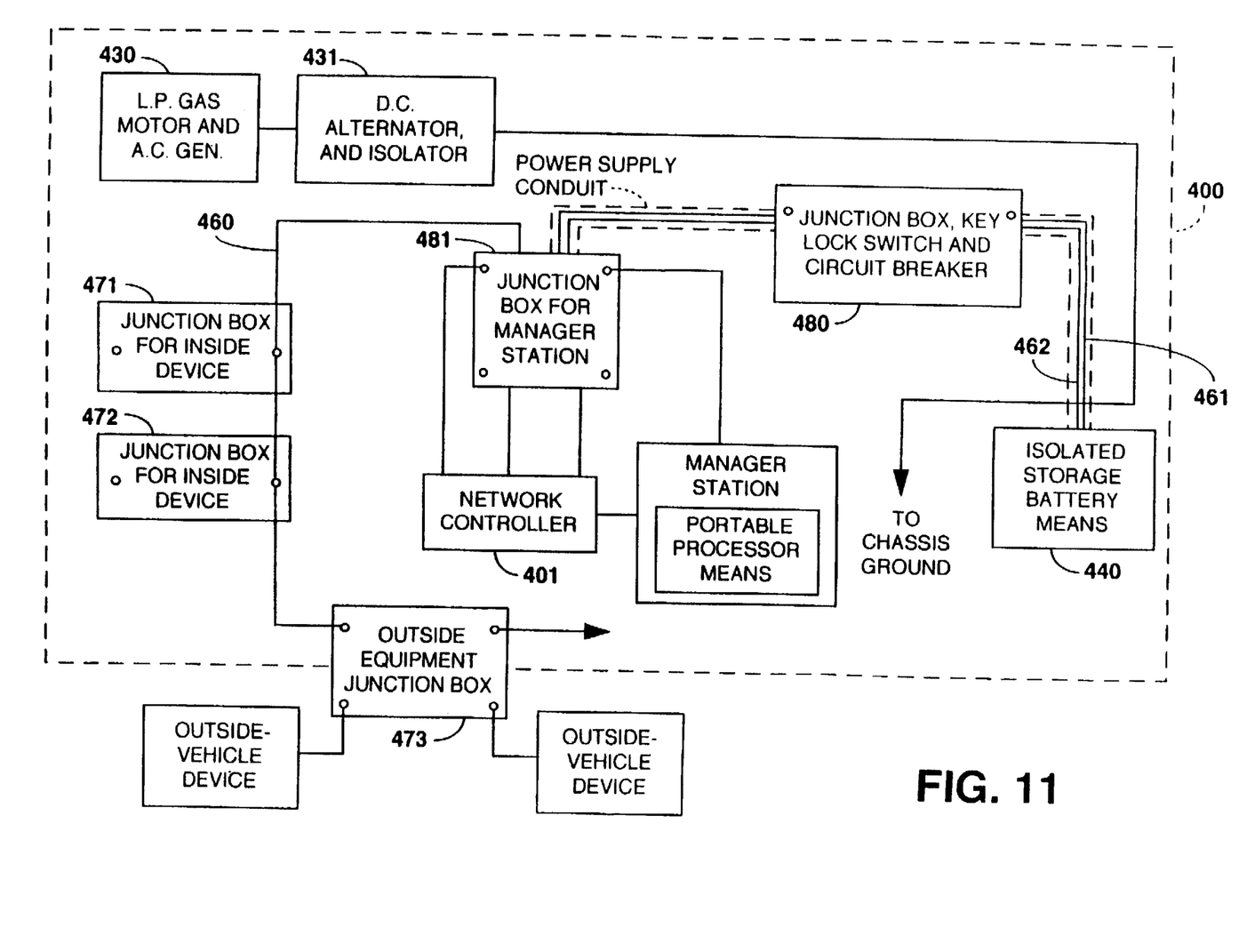
FIG. 11 is a diagrammatic illustration showing the distribution of power from a vehicle system power source.

The incorporated application U.S. Ser. No. 06/915,023 in a second figure thereof shows a system block diagram on which FIG. 10 hereof has been based. FIG. 10 shows a data collection system carried by a material transport vehicle 400, including a network controller (NC) 401 with a "RS 485" communications port 402 connected with a "RS 485" multidrop bus system 410. System power 411 may be taken from a vehicle power system such as indicated at 430, 431, 440 in FIG. 11, and is supplied via a power supply path (PWR) indicated at 441, FIG. 10, to a series of mobile mount adapters such as 451-454, which are coupled to the RS 485 multidrop bus system 410. In FIG. 11, a metallic conduit 460 for power and data contains both multidrop data bus 410 and power lines 461 and 462 of power supply 440. Mobile mount adapters such as 451-454 serve to couple the multi-drop data bus and power lines with the various data devices. One or more unused mobile mount adapters or junction boxes may be connected in the metallic conduit system 460, including those at 471 and 472 which are located interiorly of the vehicle, and a double one at 473 which is conveniently accessible from the exterior of the vehicle. FIG. 11 shows the distribution of power from a vehicle system power source e.g. a data processing battery 440 to the network controller 401 via a power junction box 480 and a further junction box 481 at the network controller 401. FIG. 11 also illustrates charging of the data processing battery 440 from an alternator and battery isolator means 431. Segments of metallic conduit extend between successive junction boxes 481, 471, 472, 473, FIG. 11, and also between the successive mobile mount adapters such as 451-454, FIG. 10, and between e.g. junction box 473, FIG. 11, and successive following mobile mount adapters.

This same type of power and data conduit system may be utilized in the product distribution vehicles, such as forklift trucks and delivery vans. Thus devices receiving vehicle power in the same way as shown in the second and fourth figures of the incorporated application Ser. No. 06/915,023, may be provided with a network controller as shown in the twelfth figure through sixteenth figure (parts A through G) of the incorporated application.

The present disclosure represents significant improvements over the incorporated application, for example in providing one or more mobile mount adapters such as 11, FIG. 1, 45, 46, 47, FIG. 3, and 70, FIG. 4, on a multi-drop data bus with diverse peripheral devices such as 12 to 15, FIG. 1, 49, FIG. 3, and 61 to 67, FIG. 4. Further, various devices may be added to the system on a dynamic basis during system operation, and assigned addresses as they become active on the network.

Additionally the conduit system containing the LAN data bus and power supply conductors may also contain a charging power line for supplying charging power to one of the contact fingers 116 which mates with the charging current input contact e.g. IIIA, FIG. 9, of the terminal 10.

Discussion of Related Patent Application Concerning Battery Charging Control A pending application of Steven E. Koenck "MICROPROCESSOR CONTROLLED FAST CHARGING SYSTEM" U.S. Ser. No. 07/266,537 filed Nov. 2, 1988, now abandoned is a continuation in part of application Ser. No. 07/168,352 filed Mar. 15, 1988, now U.S. Pat. No. 4,885,523, issued Dec. 5, 1989 and the entire disclosures including the drawings of these applications Ser. No. 07/168,352 and Ser. No. 07/266,537 are hereby incorporated herein by reference.

The twenty-seventh figure of these incorporated applications shows a charging arrangement which may be applied to an individually manned transport vehicle with local area network system as taught herein. Thus terminal 10 of the present disclosure may incorporate the terminal system (27-10A) and battery pack (27-10B) of the twenty-seventh figure. A charger (27-22) may be mounted adjacent mobile mount adapter 11 and receive charging power from the vehicle. Where the vehicle system supplies power at a relatively high voltage such as seventy-two volts, preferably such voltage is reduced to a lower voltage value such as twelve volts at a location near the vehicle power source and then power at such lower voltage value is supplied by a suitable cable to the charger component (27-22). In this embodiment, the charger has terminals labeled +CHARGE, TEMP, GND, CHG CONTROL which would be connected to four of the spring fingers 110, FIG. 7, of the mobile mount adapter 11. The other two spring fingers 110 would be connected to the lines LAN+DATA and LAN−DATA of the twenty-seventh figure which would correspond with LAN data bus 16, FIG. 1. The LAN interface (27-39) of the twenty seventh figure would include line driver/receiver 95, FIG. 6, which would receive +5 volts and the Power control signal from the microcomputer of the terminal system (27-10A) of the twenty-seventh figure.

Where the terminal 10 is provided with an RF transceiver, the terminal may correspond with that described in the pending application to George E. Chadima, Jr. and Darald R. Schultz application Ser. No. 07/104,653 filed Oct. 2, 1987, "HAND-HELD COMPUTER SYSTEM," abandoned, parent of application Ser. No. 07/406,822, now U.S. Pat. No. 4,953,113, issued Aug. 28, 1990.

The complete disclosure including the drawings of this application Ser. No. 07/104,653 is hereby incorporated herein by reference. Further information concerning RF transceiver type terminals is found in APPENDIX B of incorporated patent application Ser. No. 07/305,302.

Discussion of Claim Terminology and Modifications Pertinent Thereto

FIGS. 1, 3 and 4 illustrate vehicle data systems for vehicles such as forklift trucks and delivery vans which are utilized in product transport processes and the like. Such vehicles normally contain vehicle electric power means associated with the vehicle drive, e.g. a motive power engine driven alternator or generator and vehicle storage battery for use in starting the engine, or electric storage batteries which themselves provide the propulsion energy. The vehicle power represented at 19 in FIG. 1, and at 72 in FIG. 4 preferably is derived from the vehicle electric power means. Vehicle power may also energize the LAN devices 12 to 15, FIG. 1, 45, 46, 47 and 49, FIG. 3, and 66 and 67, FIG. 4, as well as the interface circuits for devices 12 to 15, 49 and 61 to 67 which may correspond with LAN interface 95, 97, 98, FIG. 6. In such a case vehicle power is supplied via suitable voltage regulator means to points such as 140 and 141 in FIG. 6 as well as to microcomputer 98, for each device permanently associated with the LAN data bus in FIGS. 1, 3 and 4. Where components such as 95, 97, 98 in FIG. 6 are part of a removable device such as terminal 10, FIG. 1, terminals 41, 42, 43, FIG. 3, and 60, FIG. 4, such components may be supplied from battery power carried with the removable device, or from charging power (+CHG) derived from the vehicle electric power means, e.g. 19 or 72. The local area network means of FIGS. 1, 3 and 4 is preferably powered at least in part from vehicle electric power means and independently of fixed power sources (such as represented at 38 in FIG. 2).

While FIG. 1 shows an optical or RF scanner means 18 connected by a cable 150 and cable fitting 120 with a connector of the terminal 10 to form data terminal and scanner means, parts 10 and 18 may be in a single unit as shown for example in a pending application of Phillip Miller, et al., U.S. Ser. No. 07/136,097 filed Dec. 21, 1987, now abandoned. The entire disclosure of this application including the drawings is incorporated herein by reference.

The handle 15 of the first and third figures of the incorporated drawings of Ser. No. 07/136,097 may contain a series of external contacts corresponding to contacts 111, FIGS. 7 and 9, for engaging with spring fingers corresponding to fingers 110, FIGS. 7 and 8. In this case, the receiving channel of the mobile mount adapters of FIGS. 1 through 4 would frictionally receive the handgrip part 15 and support the horizontally extended undersurface of the scanner barrel, while providing adequate clearance so as to insure against actuation of the trigger 32 as the scanner and terminal means 10 is inserted into and removed from the various adapters. Convenient access to the card receptacle 20 of the incorporated scanner and terminal means would thus be provided while the scanner and terminal unit was in place in each adapter. Also the scanner and terminal unit would be held securely to enable normal application of manual pressure to the keyboard segments 11a, 11B.

Alternatively, the mobile mount adapters may contain interface components such as 95, 97, 98 which are energized from vehicle power, and also alternatively an optical coupling may be provided between a light emitting diode and light sensor of the scanner and terminal unit of the incorporated application and the microcomputer 98 within each adapter for accommodating the interchange of data between the scanner and terminal unit and the LAN data bus, e.g. to effect printout of data from the scanner and terminal unit on a printer such as 14, FIG. 1, 49, FIG. 3 or 66, FIG. 4, or to effect transmission of data via component 37, FIG. 2, or 67, FIG. 4.

The present invention is particularly directed to an individually manned transport vehicle where the driver of the vehicle is the one concerned with operation of the on board devices. Since the driver at times must devote full attention to guidance of the vehicle, it is particularly appropriate that the data capture devices can be quickly inserted into and removed from mobile mount adapters, so that the driver may be completely unencumbered while driving the vehicle. It is advantageous to have a large area display which can be read at a distance e.g. from the driver seat of the vehicle. Such a display can provide information which is useful in moving from one work location to another, e.g. geographical type information; the display being positioned so that such information can be read at a glance e.g. during a brief stop of the vehicle while the driver remains at the controls of the vehicle.

Each of the connectors such as represented at 161 to 165, FIG. 1, 166 to 169, FIG. 3, and 171 to 173, FIG. 4, may be a standardized quick-connect end quick-disconnect type so that adapters and devices may be interchanged and placed at desired locations about each type of individually manned transport vehicle. For example, each connection such as 161 may include a set of spring fingers such as 110 receiving the LAN+ and LAN– connections such as 101,102, FIG. 6. Each device may then include an interface such as shown at 95, 97, 98, and power supply means for energizing these components from vehicle electric power, (vehicle electric power being available e.g. from a twelve-volt d.c. plug-in power receptacle adjacent each connection 161–169, 171–173).

Each connection such as 110, 111, FIG. 7, may be maintained by a frictional ball and socket type detent such as indicated at 180, FIG. 7, which seats with an audible click into a terminal recess 181 when correct deflection of spring contacts 110 has been achieved.

Discussion of Existing Commercially Available Components

The "Route-commander" system by Norand consisting of a high-performance portable data terminal coupled to a ruggedized printer has virtually eliminated the use of manual route books and handwritten invoices in the beverage, snack, dairy and bakery delivery industries. Literature on this system is shown in APPENDIX C of incorporated patent application Ser. No. 07/305,302. This is one example where an individually manned transport vehicle may utilize a vehicle data system as disclosed herein.

With the introduction of low cost, efficient data communication radio systems such as the RT1200 and 2200 systems by Norand, it has become attractive to utilize radio data communications to automate the information processes used in material handling, particularly on lift trucks. The RT1210 and RT2210 data terminals are battery powered hand-held two way radio data transceivers with keyboard, LCD display, built in radio communication hardware and support for high performance optical bar code readers. Communication to the portable terminals is accomplished by interfacing an RM2216 terminal multiplexor and RB2212 base transceiver to a host computer through a communication port. The host computer may transmit to or receive data from any selected terminal at any time. Although the RT1210 and RT2210 terminals were originally designed for hand-held operation, they have been used in mobile applications by placing the entire terminal into a receptacle which holds the unit firmly in place and isolates the unit from vibration and shock. Power for operation is provided by the terminal battery pack. Literature pertaining to the commercially available components is shown in APPENDIX B of incorporated patent application Ser. No. 07/305,302.

FIG. 7 shows a holster 190 on base 131 for receiving and securely retaining a scanner such as 18, e.g. by a resilient liner 191 of the holster 190 frictionally engaging with a barrel 192 of the scanner. The holster 190 may be constructed e.g. at 193 to hold the handgrip part 194 and trigger 195 clear thereof so that the scanner of FIG. 7 is quickly and easily removed by manually grasping the handgrip part 194, and so that the trigger 195 will not be actuated as the scanner is manually inserted into the holster.

The scanner for bar codes need not be physically attached to the terminal. In configurations for warehouse scanning systems, a lot of the software effort involved may represent the accommodation of the periodic removal of major sections of the system to do remote scanning of marginally accessible codes. In conventional practice the scanner is always attached to the terminal by a pendant cable and if the code to be scanned is beyond the reach of the cable then the terminal must necessarily be removed from its holster. The terminal may represent a very significant portion of a "LAN" system and to remove it in this fashion may disable the system generally, placing the terminal in its holster again may entail the reestablishment of the hierarchial or virtual address structure that was established prior to the removal of the terminal.

If, however, it is possible to only remove the scanner and to not be tied to the terminal by a cable then the degree of disability imposed upon the "LAN" system is significantly lessened and the software effort to develop such a system would be reduced.

The terminals now incorporate various types of scanner interfaces. Some of them have been add-on devices to accommodate scanner types manufactured by third parties. Others have been built-in and have been used to communicate with scanners such as shown in U.S. Pat. No. 4,766,300. Some of these hand-held terminal devices provide power converters accommodating the requirements idiosyncratic to specific scanner types. All of such scanners directly draw power from the terminal, reducing operational time per battery charge.

A scanner such as 18, FIG. 7, may be operated while disconnected from the terminal on a permanent basis. Terminals presently connect with a host by an RF link and maintain contact without benefit of cable. Of course, terminals mounted on a vehicle will be drawing their power from the vehicular electrical system. The power requirements for a scanner connected by cable to a terminal on a vehicle as in FIG. 7 will not be a large factor in the power budget imposed upon the terminal.

Detaching the terminal from the scanner completely, provides benefits in the area of flexibility and ease of use. Since the scanner doesn't require contact with or attachment to the terminal the job of providing operating power no longer is the province of the terminal. The scanner, being completely portable would require its own battery pack but this pack would not have to be unusually capacious. Once the scanning function has been performed the scanner can be reinserted in its holster on the vehicle and charged back up to full capacity from vehicle power by its own charger.

The communication link replacing cable 150, FIG. 7, may be ultrasonic but could also be infrared or even another very low power RF link. Various modulation and demodulation schemes could be employed and the choice of the most appropriate means of encoding data on the channel would depend greatly upon the channel type used. Once the code had been read, the link between the scanner and the terminal could employ one of the various error checking and correcting procedures.

Physically the terminals would still incorporate a form of scanner interface but the link would not be mechanical. It would be desirable to provide a bidirectional data path. The scanner would include the matching interface to implement the link and using a bi-directional data path the scanner could receive an acknowledgement after a scan. Reception of such an acknowledgement would constitute an indication of a valid scan and the illumination of an indicator light would provide operator feedback. The lack of a response from the terminal in a specified time period would constitute a negative acknowledgement and another indication on the scanner would signal the operator that another scan was necessary.

Appropriate scanners for this type of operation would include current wand and modified CCD type scanners of Norand Corporation and a number of other manufacturer's laser scanners.

This scanner would be used typically, by a forklift operator in close proximity to his vehicle. Limited range would not be a significant deterrent here and may even be a benefit in an operation where multiple units are in use.

As to assignment of addresses to devices on a dynamic basis as they are added to the system, reference is made to copending application U.S. Ser. No. 07/784,748 filed Oct. 28, 1991 which is a Rule 62 continuation of application Ser. No. 07/347,849 filed May 3, 1989 and the entire disclosure including Appendices and drawings of said Rule 62 continuation application is hereby incorporated herein by reference.

Obviously, many modifications and variations of the present invention are possible in light of the above teachings. It is therefore to be understood that, within the scope of the appended claims, the invention may be practiced otherwise than as specifically described.

What is claimed is:

1. A communication system used to assist deliveries of goods or services via a vehicle, the communication system comprising:

a stationary computer that stores delivery information;

a stationary radio communicatively coupled to the stationary computer;

a vehicle delivery system comprising a vehicle radio, a communication link, a control circuit communicatively coupled to both the vehicle radio and the communication link, and a portable data device that operates both in a portable mode and, when communicatively coupled to the communication link, in a coupled mode; and in the coupled mode, the portable data device receives at least portions of the delivery information from the stationary computer via the stationary radio, the vehicle radio and the control circuit.

2. The communication system of claim 1 wherein the control circuit further comprises a memory that stores at least portions of the delivery information received by the vehicle radio from the stationary computer via the stationary radio when the portable terminal operates in the portable mode.

3. The communication system of claim 1 wherein the vehicle radio and the control circuit are both mounted in the vehicle.

4. The communication system of claim 1 wherein the portable data device communicatively couples with the communication link via a docking adapter.

5. The communication system of claim 4 wherein the docking adapter provides supplemental power to the portable terminal when in the coupled mode.

6. The communication system of claim 1 wherein the vehicle comprises a power source, and the vehicle delivery system receives power from the power source.

7. A communication system used to assist deliveries of goods or services, the communication system comprising:

a stationary computer that stores delivery information;

a stationary radio communicatively coupled to the stationary computer;

a portable delivery system comprising a portable radio, a communication link, a memory circuit communicatively coupled to both the portable radio and the communication link, and a portable data device that operates both in a portable mode and, when communicatively coupled to the communication link, in a coupled mode;

the memory circuit stores at least portions of the delivery information received by the portable radio from the stationary computer via the stationary radio when the portable data device operates in the portable mode; and the portable data device receives the at least portions of the delivery information stored by the memory circuit when in the coupled mode.

8. The communication system of claim 7 further comprising a control circuit that manages the memory circuit in storing the at least portions of the delivery information received from the stationary computer, and that manages the delivery of the at least portions stored by the memory circuit to the portable data device when in the coupled mode.

9. The communication system of claim 7 wherein the portable radio and the memory circuit are both mounted in a vehicle.

10. The communication system of claim 9 wherein the portable data device communicatively couples with the communication link via a docking adapter.

11. The communication system of claim 10 wherein the docking adapter provides supplemental power to the portable data device when in the coupled mode.

12. The communication system of claim 9 wherein the vehicle comprises a power source, and the portable delivery system receives power from the power source.

13. A communication system used to assist deliveries of goods or services via a vehicle, the communication system comprising:

a stationary computer that stores delivery information;

a stationary radio communicatively coupled to the stationary computer;

a vehicle delivery system comprising a vehicle radio, an adapter, a control circuit communicatively coupled to the vehicle radio, and a portable data device that operates both in a portable mode and, when receivingly coupled with the adapter, in a coupled mode; and in the coupled mode, the portable data device receives at least portions of the delivery information from the stationary computer via the stationary radio, the vehicle radio and the control circuit.

14. The communication system of claim 13 wherein the control circuit further comprises a memory that stores at least portions of the delivery information received by the vehicle radio from the stationary computer via the stationary radio when the portable terminal operates in the portable mode.

15. The communication system of claim 13 wherein the vehicle radio, the adapter and the control circuit are mounted in the vehicle.

16. The communication system of claim 13 wherein the adapter provides supplemental power to the portable terminal when in the coupled mode.

17. The communication system of claim 13 wherein the vehicle comprises a power source, and the vehicle delivery system receives power from the power source.

\* \* \* \* \*